(12) United States Patent
Ito et al.

(10) Patent No.: US 11,788,579 B2
(45) Date of Patent: Oct. 17, 2023

(54) ROLLING BEARING AND METHOD FOR PRODUCING SAME

(71) Applicant: NSK LTD., Tokyo (JP)

(72) Inventors: Hirofumi Ito, Fujisawa (JP); Masahide Natori, Fujisawa (JP); Hideyuki Hidaka, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/799,069

(22) PCT Filed: Jan. 27, 2021

(86) PCT No.: PCT/JP2021/002923
§ 371 (c)(1),
(2) Date: Aug. 11, 2022

(87) PCT Pub. No.: WO2021/166577
PCT Pub. Date: Aug. 26, 2021

(65) Prior Publication Data
US 2023/0175553 A1 Jun. 8, 2023

(30) Foreign Application Priority Data

Feb. 17, 2020 (JP) ................................ 2020-024705

(51) Int. Cl.
*F16C 33/58* (2006.01)
*F16C 33/62* (2006.01)
(Continued)

(52) U.S. Cl.
CPC ............ *F16C 33/585* (2013.01); *F16C 19/06* (2013.01); *F16C 33/62* (2013.01); *F16C 33/64* (2013.01);
(Continued)

(58) Field of Classification Search
CPC ........ F16C 19/06; F16C 33/585; F16C 33/62; F16C 33/64; F16C 2204/60;
(Continued)

(56) References Cited

U.S. PATENT DOCUMENTS 5,960,250 A 9/1999 Yasumoto et al.
6,290,398 B1 * 9/2001 Fujiwara ................. F16C 33/64
384/492
(Continued)

FOREIGN PATENT DOCUMENTS

CN 101642789 A * 2/2010 .......... B21D 19/088
CN 107475603 A * 12/2017
(Continued)

OTHER PUBLICATIONS

Office Action dated Aug. 16, 2022, issued by the Japan Patent Office in counterpart Japanese Patent Application No. 2021-555354.
(Continued)

*Primary Examiner* — Phillip A Johnson
(74) *Attorney, Agent, or Firm* — Sughrue Mion, PLLC (57) ABSTRACT

In a raceway surface of at least one of an inner ring and an outer ring, a region not affected by machining is set as a first region, and a region, which has (a) a machining amount of 0.03 or more, (b) an amount of residual austenite being 70% or more of an amount of retained austenite in the first region, and (c) a compressive residual stress being higher by 500 MPa or more than a compressive residual stress in the first region, is set as a second region.

2 Claims, 4 Drawing Sheets

(51) Int. Cl.
    *F16C 33/64* (2006.01)
    *F16C 19/06* (2006.01)
(52) U.S. Cl.
    CPC ...... *F16C 2204/60* (2013.01); *F16C 2223/02* (2013.01)
(58) Field of Classification Search
    CPC .............. F16C 2204/62; F16C 2204/64; F16C 2204/66; F16C 2223/02; F16C 2223/06; F16C 2223/08; B24B 39/003; B24B 39/006; B24B 39/02; B24B 39/023; B24B 39/026; B24B 39/04; B24B 39/045
    See application file for complete search history.

(56) References Cited

U.S. PATENT DOCUMENTS

| | | | | |
|---|---|---|---|---|
| RE38,936 E | * | 1/2006 | Nakamura | H02K 5/1732 310/90 |
| 8,782,902 B2 | * | 7/2014 | Pyun | B24B 35/00 29/898.13 |
| 2005/0160602 A1 | * | 7/2005 | Shibata | B24B 39/04 29/90.01 |
| 2010/0296764 A1 | * | 11/2010 | Strandell | C21D 1/10 148/567 |
| 2012/0177527 A1 | * | 7/2012 | Kerrigan | C22C 33/0285 419/49 |
| 2018/0156275 A1 | * | 6/2018 | Beer | B21D 53/10 |

FOREIGN PATENT DOCUMENTS

| | | | | |
|---|---|---|---|---|
| CN | 107504072 A | * | 12/2017 | |
| DE | 102015201644 A1 | * | 8/2016 | ............... B23P 9/02 |
| EP | 1048744 A1 | | 11/2000 | |
| EP | 2759729 A1 | * | 7/2014 | ............... C21D 9/40 |
| JP | 10-047334 A | | 2/1998 | |
| JP | 3338761 B2 | | 10/2002 | |
| JP | 2004-116569 A | | 4/2004 | |
| JP | 2004293632 A | * | 10/2004 | ............... F01L 1/181 |
| JP | 2004-339575 A | | 12/2004 | |
| JP | 3779078 B2 | | 5/2006 | |
| JP | 2011-140992 A | | 7/2011 | |
| JP | 2011-208751 A | | 10/2011 | |
| JP | 2011208751 A | * | 10/2011 | |
| JP | 2016035333 A | * | 3/2016 | ............... C21D 1/06 |
| JP | 2019-90475 A | | 6/2019 | |

OTHER PUBLICATIONS

Search Report (PCT/ISA/210) dated Apr. 6, 2021 by the International Searching Authority in International Application No. PCT/JP2021/002923.
Written Opinion (PCT/ISA/237) dated Apr. 6, 2021 by the International Searching Authority in International Application No. PCT/JP2021/002923.
Communication dated Feb. 1, 2022 by the Japanese Patent Office for Japanese Patent Application No. 2021-555354.
Extended European Search Report dated Jun. 7, 2023 in European Application No. 21756521.7.

* cited by examiner

ROLLING BEARING AND METHOD FOR PRODUCING SAME

CROSS REFERENCE TO RELATED APPLICATIONS

This application is a National Stage of International Application No. PCT/JP2021/002923 filed on Jan. 27, 2021, claiming priority based on Japanese Application No. 2020-024705 filed on Feb. 17, 2020, the entire contents of which are incorporated by reference herein.

TECHNICAL FIELD

The present invention relates to a rolling bearing and a method for manufacturing the rolling bearing, more specifically to a rolling bearing and a method for manufacturing the rolling bearing capable of preventing inclusion-induced flaking occurring at different internal depths from a surface layer of a raceway surface.

BACKGROUND ART

The life of a rolling bearing is determined by a standard of ISO or the like, and it is required to ensure the life to a specified period of time. With respect to the rolling bearing, a state in which the rolling bearing is not smoothly rotated is regarded as an end of a life thereof, and various causes such as seizure, abrasion, and flaking can be cited. Among these, flaking is caused by fatigue of metal, and in general, the anti-flaking life is considered to be the life thereof.

The anti-flaking life of the rolling bearing is largely influenced by conditions of lubricating oil and a state of a material, in addition to operating conditions such as a load condition and a rotational speed, and cause-specific measures are usually taken. For example, when a foreign matter or the like is mixed in during use, flaking occurs from an indentation generated by biting of the foreign matter. In addition, due to the same mechanism, minute continuous flaking, which is referred to as peeling, occurs in an environment of depleted lubrication. Such flaking occurs earlier as compared with flaking which occurs in an environment of good lubrication. Therefore, for example, by increasing the amount of austenite retained on a surface thereof by using a thermal treatment such as carbonitriding, the anti-flaking life of the rolling bearing is extended.

When mixing-in of a foreign matter is the cause, it is extremely effective to devise a structure of a seal for sealing the rolling bearing and to make a structure in which it is difficult for the foreign matter to enter the rolling bearing in the first place. Therefore, a measure is taken also by eliminating the cause of mixing-in of the foreign matter. Such a measure is particularly effective in a case where mixing-in of a foreign matter cannot be avoided by sharing lubricating oil with other components such as a gear similarly to a rolling bearing used in an automobile transmission, or effective in a case where lubricating oil cannot be determined only for the convenience of the rolling bearing.

On the other hand, it is recommended that the rolling bearing is basically used in an environment of good lubrication suitable for the rolling bearing, which is a common practice when the rolling bearing is used in general applications. Examples of the rolling bearing for such an application include a hub unit bearing (HUB) which supports a wheel of a vehicle and a rolling bearing of an electric motor. It is known that in an environment of good lubrication, a state of a material greatly affects the life. The state of a material includes various factors such as material components and hardness, and the components and the like are roughly limited by optimization of industrial mass production conditions and the like. In practical use, a non-metallic inclusion (hereinafter, also simply referred to as "inclusion") generated in a steelmaking stage is the cause of flaking. Therefore, research and development of steelmaking techniques for reducing the amount and size of inclusions have been advancing.

For example, Patent Literature 1 discloses bearing steel whose life is prolonged by controlling the number of sulfide-based inclusions having a thickness of 1 μm or more present in a test area of 320 mm$^2$ and controlling a maximum diameter of oxide-based inclusions to 10 μm or less. In addition, Patent Literature 2 discloses bearing steel whose life is prolonged by specifying the number of oxide-based inclusions present in a test area of 320 mm$^2$ from 100 to 200 and further specifying the amount of Sb which is an impurity element.

However, as in Patent Literatures 1 and 2, a specific process of limiting the number and size of inclusions causes a large load to the current production process and thus causes a decrease in productivity. Therefore, studies have been made to reduce the adverse effects of inclusions while allowing a certain degree of presence of the inclusions. Patent Literature 3 discloses a rolling bearing having a long life. In the rolling bearing, when an average hardness in a region of 100 μm to 300 μm from a surface of an inner ring, an outer ring, or a rolling element before the rolling bearing being put into operation is defined as Hv1, and an average hardness in the region of 100 μm to 300 μm from the surface of the inner ring, the outer ring, or the rolling element at the time when a calculated life is reached after the rolling bearing is operated is defined as Hv2, "(Hv2−Hv1)≥39" is specified, and an occurrence of a change in structure starting from an inclusion serving as a cause of flaking is prevented in order to prevent the flaking starting from the inclusion.

CITATION LIST

Patent Literature

Patent Literature 1: Japanese Patent No. 3338761
Patent Literature 2: Japanese Patent No. 3779078
Patent Literature 3: JP-A-2019-90475

SUMMARY OF INVENTION

Technical Problem

However, the inclusion is not necessarily present inside the rolling bearing, and may be present in a surface layer portion of a raceway surface (that is, the surface and a region adjacent to the surface). In this case, a crack may appear without a change in the structure, and the crack may progress, leading to an early flaking. Therefore, an effect of eliminating the adverse effects of the inclusion is insufficient.

The present invention has been made in view of the above problems, and an object thereof is to prevent an occurrence of flaking starting from an inclusion (hereinafter, also referred to as "inclusion-induced flaking") occurring at different internal depths from a surface layer of a raceway surface, for example, in flaking starting from an inclusion and occurring in a rolling bearing which does not share lubricating oil with other components, such as a HUB and a rolling bearing for an electric motor.

Solution to Problem

The inventors of the present application have studied in detail how flaking forms vary depending on a depth at which an inclusion is present, and found that a surface layer portion inclusion present in a surface layer portion of a raceway surface itself functions as a defect, that a crack appears directly from the inclusion, and that flaking occurs due to the progress of the crack. Further, in order to solve this problem, it has been found that it is effective to prevent the appearance of the crack and the progress of the crack and to delay the occurrence of the flaking, and it is effective to impart a compressive residual stress and to improve the crack progress resistance due to the coexistence of retained austenite.

On the other hand, the inventors of the present application have found that, with respect to an internal inclusion present in a region deeper than the surface layer portion, a white structure developed around the inclusion acts as a defect, leading to flaking. Further, it has been found that the flaking induced by the internal inclusion can be reduced by preventing the development of the white structure, and it is effective to disperse a strain in advance. In order to disperse the strain, a method in which, after the quenching and tempering treatment is performed, a raceway surface of an outer ring or an inner ring is subjected to machining to impart a compressive residual stress to the surface layer portion of the bearing ring and the strain is forcibly dispersed inside the bearing ring is conceivable. However, in the excessive machining, transformation of retained austenite to martensite in the surface layer portion of the bearing ring, which is formed at the time of the quenching and tempering treatment, is promoted, and as a result, the amount of retained austenite is decreased, which causes a decrease in the crack progress resistance.

From the above, the inventors of the present application have considered that there is an optimum quantitative relationship between the introduction of strain by machining on the raceway surface (machining amount), the amount of retained austenite in the surface layer portion of the raceway surface, and the compressive residual stress, and as a result of intensive studies, the inventors have completed the present invention.

That is, the above problems are solved by the following rolling bearing according to the present invention.

(1) A rolling bearing in which a plurality of rolling elements are rollably held between an inner ring and an outer ring, in which in a raceway surface of at least one of the inner ring and the outer ring, a region not affected by machining is set as a first region, and a region, which has:

(a) a machining amount of 0.03 or more;

(b) an amount of retained austenite being 70% or more of an amount of retained austenite in the first region; and (c) a compressive residual stress being higher by 500 MPa or more than a compressive residual stress in the first region, is set as a second region.

In addition, the above problems are solved by the following method for manufacturing a rolling bearing according to the present invention.

(2) A method for manufacturing the rolling bearing according to (1), in which after subjecting the inner ring and the outer ring to a quenching and tempering treatment, machining is performed on the raceway surface of at least one of the inner ring and the outer ring under a condition that a maximum contact surface pressure with a machining jig is 7.2 GPa or less, which is calculated assuming that only elastic deformation occurs.

Advantageous Effects of Invention

According to the present invention, the effect is remarkable particularly in a rolling bearing, such as a HUB and a rolling bearing for an electric motor, in which lubricating oil is not shared with other components, and also in the other rolling bearings, it is possible to prevent inclusion-induced flaking occurring at different internal depths from a surface layer portion of a raceway surface.

DESCRIPTION OF EMBODIMENTS

Hereinafter, the present invention will be described in detail with reference to the drawings.

Figure 1:
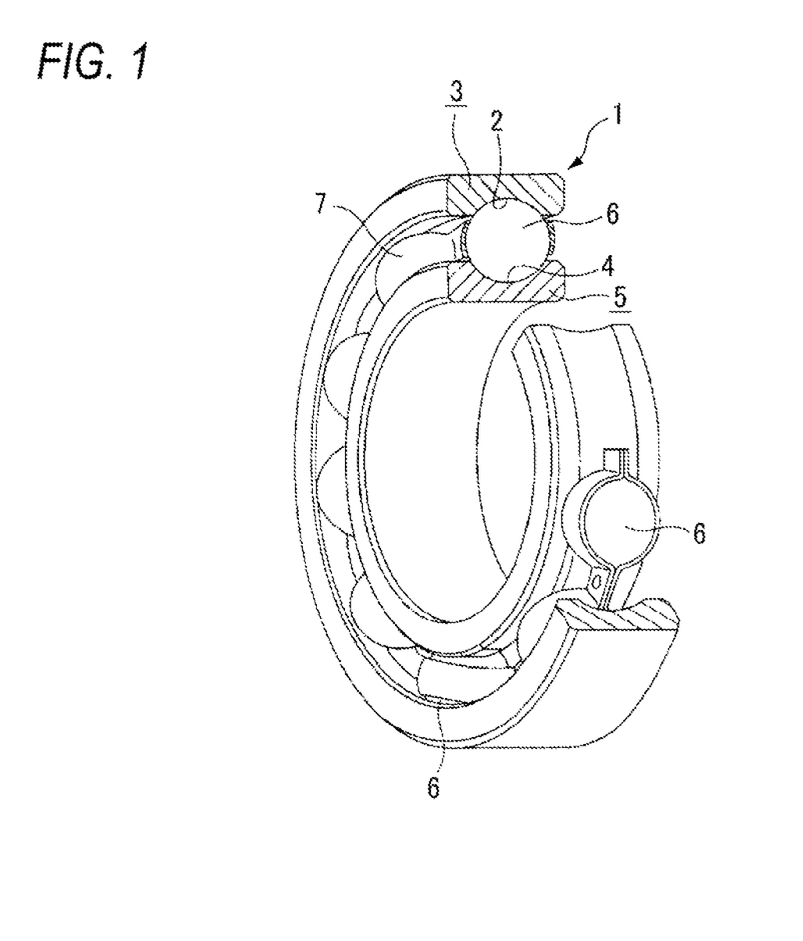
FIG. 1 is a partially cutout perspective view illustrating a radial ball bearing which is an example of a rolling bearing according to the present invention.

In the present invention, a type and a configuration of a rolling bearing are not limited, and for example, a radial ball bearing illustrated in FIG. 1 can be exemplified. As illustrated, a radial ball bearing 1 includes an outer ring 3 having an outer ring raceway surface 2 on an inner peripheral surface thereof, an inner ring 5 having an inner ring raceway surface 4 on an outer peripheral surface thereof, and a plurality of balls 6 provided between the outer ring raceway surface 2 and the inner ring raceway surface 4 and serving as rolling elements. The balls 6 are rollably held by a cage 7 in a state in which the balls 6 are disposed at equal intervals in a circumferential direction.

A material of the outer ring 3, the inner ring 5, and the balls 6 is not particularly limited, and SUJ2, SUJ3 or the like which are general steel materials for rolling bearing can be used. Therefore, the raw material cost can be reduced without adjusting an additive element of the steel material. However, in the present invention, in at least one of the inner ring raceway surface 4 and the outer ring raceway surface 2, preferably, both of the inner ring raceway surface 4 and the outer ring raceway surface 2, a region such as core part which is not affected by machining is defined as a first region, and a region, which has:

(a) a machining amount of 0.03 or more;

(b) an amount of retained austenite being 70% or more of an amount of retained austenite in the first region; and (c) a compressive residual stress being higher by 500 MPa or more than a compressive residual stress in the first region, is defined as a second region.

In order to satisfy the physical properties of (a) to (c), in manufacturing the outer ring 3 and the inner ring 5, after subjecting the outer ring 3 and the inner ring 5 to the quenching and tempering treatment, it is important to perform machining on the outer ring 3 and the inner ring under a condition that a maximum contact surface pressure with a machining jig is 7.2 GPa or less, which is calculated assuming that only elastic deformation occurs. The first region such as a core part, which is deeper than the second region and is not affected by machining, is a so-called "unmachined region", and a region affected by machining is a "machined region". The "machined region" includes the second region.

Here, the first region can be defined as, for example, a region having a depth of 250 μm or more when viewed from a surface (depth of 0 μm) of the raceway surface. The second region can be defined as, for example, a region covering from the surface (depth of 0 μm) to a depth of 150 μm of the raceway surface.

The machining is not particularly limited as long as the machining adopts a machining method capable of imparting a compressive stress, and is preferably, for example, burnishing or shot peening.

The burnishing is a machining method of pressing a machining jig. As an example, there is a machining method in which a device provided with a component, which has a spherical tip and is high in hardness, is pressed against the outer ring raceway surface 2 and the inner ring raceway surface 4, and the outer ring 3 and the inner ring 5 are rotated about their own axes so as to apply a compressive stress. A maximum contact surface pressure with the machining jig, which is calculated assuming that only elastic deformation occurs, is limited to 7.2 GPa or less.

The shot peening is a machining method of injecting a projection material having a high hardness to the outer ring raceway surface 2 and the inner ring raceway surface 4. Processing conditions such as the size, material, and injection speed of the projection material can be adjusted to adjust the quality to the same quality as obtained by burnishing.

It is to be noted that previous processes of the above machining can be performed according to a method in the related art. First, the steel material is forged and formed into a substantially annular material. This substantially annular raw material is subjected to a cutting process by turning to manufacture an outer ring-dedicated blank material and an inner ring-dedicated blank material that have a predetermined shape. Next, the blank material is subjected to a quenching and tempering treatment, and then the outer ring raceway surface 2 and the inner ring raceway surface 4 are finished with a predetermined precision by polishing. Thereafter, surface layer portions of the outer ring raceway surface 2 and the inner ring raceway surface 4 are subjected to machining such as burnishing described above, and are finally subjected to finishing.

Here, when the maximum contact surface pressure exceeds 8.2 GPa in a preliminary test, an excessive contact surface pressure is achieved, and the physical properties of the above (a) to (c) cannot be satisfied. As a result, it is considered that an effect of prolonging the life of the rolling bearing is reduced. A lower limit of the maximum contact surface pressure is preferably 5.8 GPa, and when the maximum contact surface pressure is lower than 5.8 GPa, the compressive stress becomes small and shallow. A preferable maximum contact surface pressure is 7.3 GPa.

EXAMPLES

Hereinafter, the effects of the present invention will be specifically described with reference to Example and Comparative Example, but the present invention is not limited thereto.

(Preliminary Test)

In this example, burnishing was employed as the machining, and machining conditions of burnishing were examined. First, a bearing ring having a predetermined shape was manufactured using bearing steel as a raw material, and was subjected to a quenching and tempering treatment. Thereafter, predetermined polishing was performed on the bearing ring, and then burnishing was further performed under three different conditions to manufacture three types of thrust ball bearings having different specifications.

In a burnishing apparatus, a tip shape of a burnishing tool is φ3 mm, a slip ratio is 100%, a circumferential speed is 100 m/min, a feed rate of the burnishing tool is 0.05 mm/rev, and a pushing amount of the burnishing tool is 0.3 mm. Further, at the time of machining, a filtered machining liquid was supplied. Then, with respect to a contact surface pressure between the burnishing tool and a raceway surface in the burnishing, a maximum contact surface pressure (P) was calculated assuming that only elastic deformation occurred. The maximum contact surface pressures (P) of the rolling bearings manufactured in the preliminary test were P=5.8 GPa, P=7.3 GPa, and P=8.2 GPa, respectively.

Next, results of measuring a residual stress in a depth direction from the surface of the raceway surface of the bearing ring by the X-ray diffraction method for each maximum contact surface pressure (P) are indicated in Table 1. It can be said that a value of the residual stress in a surface layer of the raceway surface is a negative value, and a compressive stress is imparted. Further, it can be seen that as the maximum contact surface pressure (P) increases, a larger compressive stress can be introduced to a deeper depth.

TABLE 1

| Depth from surface of raceway surface (μm) | Maximum contact surface pressure P = 5.8 GPa Residual stress (MPa) | Maximum contact surface pressure P = 7.3 GPa Residual stress (MPa) | Maximum contact surface pressure P = 8.2 GPa Residual stress (MPa) |
| --- | --- | --- | --- |
| 0 | −861 | −797 | −724 |
| 40 | −956 | −1153 | −1075 |
| 80 | −404 | −1067 | −1229 |
| 100 | −185 | −811 | −1231 |
| 120 | −89 | −639 | −1069 |
| 160 | −40 | −189 | −651 |
| 200 | −32 | −43 | −288 |
| 250 | −73 | 37 | −64 |
| 300 | 7 | 32 | −28 |

Table 2 indicates results of measuring the amount of retained austenite in the depth direction from the surface of the raceway surface of the bearing ring by the X-ray diffraction method. A region having a depth of 250 μm or more is set as an unmachined region (first region), and is a region which is not affected by burnishing. A region covering from the surface (depth of 0 μm) to a depth less than 250 μm is a machined region, and is a region affected by burnishing. As the maximum contact surface pressure (P) increases, the retained austenite in the machined region undergoes martensitic transformation, and the amount of retained austenite decreases.

The reason why the amount of retained austenite at the surface (depth of 0 μm) was small is that the amount of retained austenite was reduced to about 5% in the polishing before burnishing.

TABLE 2

| Depth from surface of raceway surface (μm) | Maximum contact surface pressure P = 5.8 GPa | | Maximum contact surface pressure P = 7.3 GPa | | Maximum contact surface pressure P = 8.2 GPa | | Range of burnishing |
|---|---|---|---|---|---|---|---|
| | Retained austenite amount (%) | Residual ratio of retained austenite to that in unmachined region (%) | Retained austenite amount (%) | Residual ratio of retained austenite to that in unmachined region (%) | Retained austenite amount (%) | Residual ratio of retained austenite to that in unmachined region (%) | |
| 0 | 4.9 | 45 | 4.6 | 37 | 4.6 | 40 | Machined region |
| 40 | 9.7 | 89 | 7.9 | 63 | 4.7 | 41 | |
| 80 | 9.6 | 88 | 9.9 | 79 | 5 | 44 | |
| 100 | 11.2 | 102 | 10.8 | 86 | 6.1 | 54 | |
| 120 | 11.4 | 104 | 11.4 | 91 | 7.3 | 64 | |
| 160 | 11 | 100 | 11.8 | 94 | 8.8 | 77 | |
| 200 | 11.6 | 106 | 12.2 | 98 | 8.9 | 78 | |
| 250 | 11.2 | 100 | 12.6 | 100 | 12 | 100 | Unmachined region |
| 300 | 10.7 | | 12.4 | | 10.8 | | |

From Table 1 and Table 2, when the maximum contact surface pressure calculated assuming that only the elastic deformation occurs is 7.3 GPa or less, it is possible to secure 63% or more of the amount of retained austenite in the machined region with respect to the amount of retained austenite in the unmachined region while imparting the compressive residual stress in the machined region.

Example 1

An inner ring, an outer ring, and a rolling element were manufactured using bearing steel as a raw material, and were quenched and tempered. In order to allow a large number of inclusions to exist at different internal depths from a surface layer portion of a raceway surface of the inner ring, a raw material in which a large number of inclusions were present was used. For the outer ring and the rolling element, a raw material having an extremely small amount of inclusions was used. Thereafter, burnishing was performed on the raceway surface of the inner ring, and raceway surfaces of the inner ring and the outer ring were further finished to manufacture a deep groove ball bearing having a bearing number of 6206. Here, the maximum contact surface pressure (P) in burnishing was set as 7.2 GPa, which was calculated assuming that only elastic deformation occurred, based on the results of the preliminary test. Other machining conditions in burnishing were the same as those in the preliminary test.

Comparative Example 1

A 6206 deep groove ball bearing was manufactured in the same manner as in Example 1 except that burnishing was not performed on the raceway surface of the inner ring after quenching and tempering.

Using the 6206 deep groove ball bearings of Example 1 and Comparative Example 1, a rolling fatigue life test was carried out under the following conditions. A lubrication condition is a good condition in which an oil film is sufficiently secured and there is almost no mixing-in of a foreign matter, and it can be said that flaking occurs from inclusions present in the surface layer or the inside. Regarding test results, a state of a flaked surface in the test is confirmed, and it is confirmed that there is no occurrence of flaking starting from an indentation caused by biting of a foreign matter.

Test load: 1410 kgf
Rotation speed: 3900 min$^{-1}$
Discontinuation: 1000 h

Figure 2:
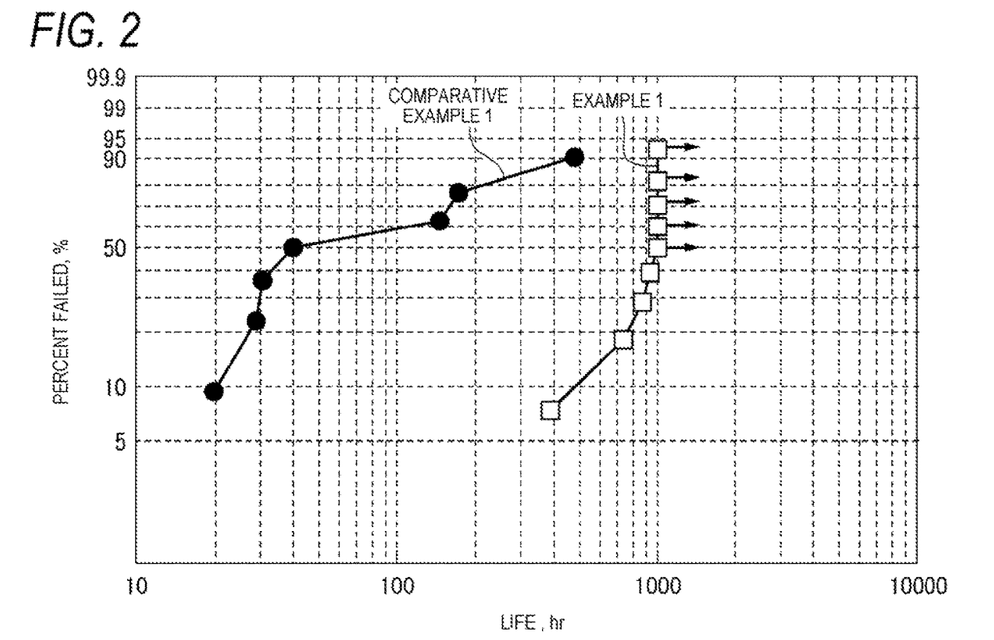
FIG. 2 is a graph illustrating a result of life test of each radial ball bearing of Example 1 and Comparative Example 1.

The results are indicated in FIG. 2. It can be seen that Example 1 has a longer life than Comparative Example 1.

Figure 3A:
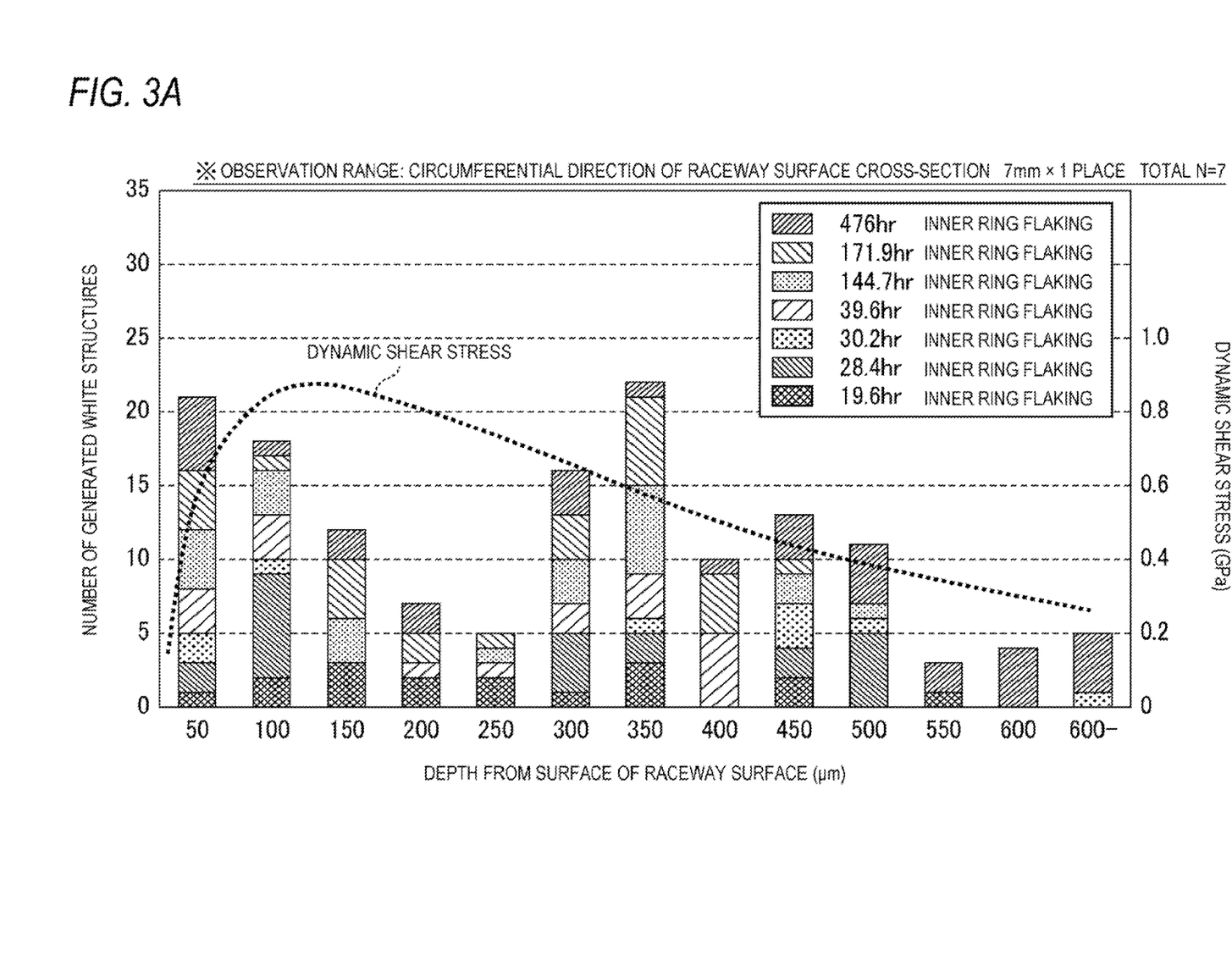
FIG. 3A is a graph illustrating a relationship between a depth from a surface of a raceway surface of an inner ring and the number of white structures generated in the radial ball bearing of Comparative Example 1.
Figure 3B:
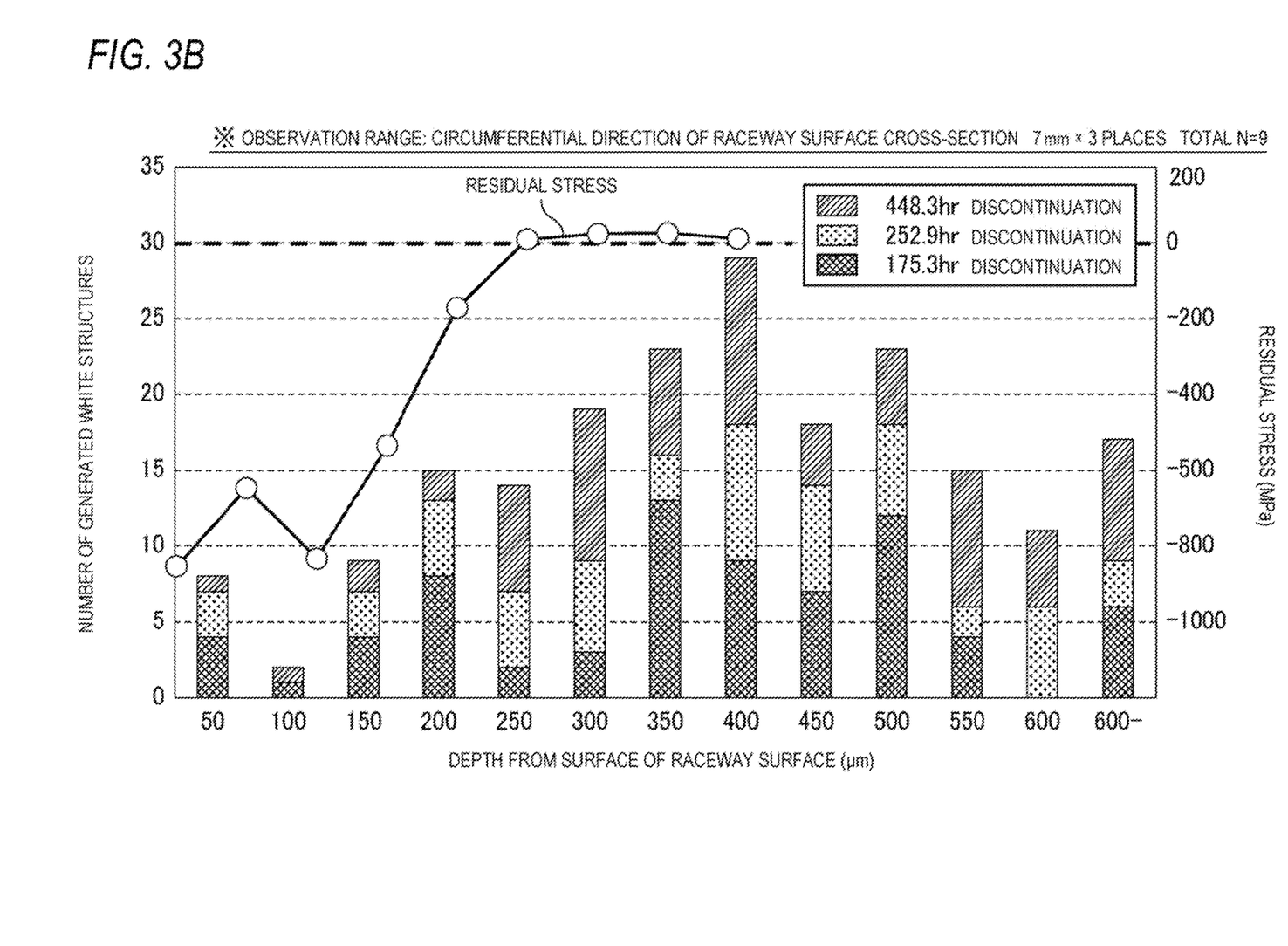
FIG. 3B is a graph illustrating a relationship between a depth from a surface of a raceway surface of an inner ring and the number of white structures generated in the radial ball bearing according to Example 1.

After the rolling fatigue life test or after the life test was interrupted at an arbitrary time, a cross-section of the inner ring raceway surface was observed, and the number of white structures (portions where the structures were changed) generated per visual field area was obtained for each depth from the surface of the raceway surface. The result of the 6206 deep groove ball bearing of Comparative Example 1 is illustrated in FIG. 3A, and the result of the 6206 deep groove ball bearing of Example 1 is illustrated in FIG. 3B. As illustrated in FIG. 3A, in the 6206 deep groove ball bearing of Comparative Example 1, it is understood that the number of white structures generated in a region from the surface of the raceway surface to a depth of 150 μm is large. In contrast, as illustrated in FIG. 3B, in the 6206 deep groove ball bearing of Example 1, it is understood that the number of white structures in a region from the surface of the raceway surface to a depth of 150 μm is significantly reduced. Note that a dynamic shear stress indicated by a dotted line in FIG. 3A is obtained by calculation, and indicates a state of a load on the raceway surface portion under the above-described test conditions.

Table 3 indicates results of measuring the amount of retained austenite and the residual stress in the depth direction from the surface of the raceway surface of the inner ring of the 6206 deep groove ball bearing of Example 1 by the X-ray diffraction method. A region which is not affected by burnishing, such as a core part of the inner ring, is defined as an unmachined region, that is, a first region. On the other hand, a region affected by burnishing is defined as an machined region, and in Example 1, when a region where generation of a white structure is prevented, that is, a region from the surface of the raceway surface to a depth of 150 μm is defined as a second region, the second region is also included in the machined region. The residual stress in the region (second region) covering from the surface of the raceway surface to the depth of 150 μm is 500 MPa or more as compared with that in the unmachined region, that is, the first region. In addition, the amount of retained austenite in the region (second region) covering from the surface of the raceway surface to the depth of 150 μm is secured to be 70% or more as compared with that in the unmachined region (first region).

TABLE 3

| Depth from surface of raceway surface (μm) | Retained austenite amount (%) | Residual ratio of retained austenite to that in unmachined region (%) | Residual stress (MPa) | Range of burnishing |
|---|---|---|---|---|
| 0 | 10.3 | 72 | −853 | Machined region (second region) |
| 50 | 14.7 | 102 | −645 | |
| 100 | 13.3 | 93 | −832 | |
| 150 | 14.5 | 101 | −532 | |
| 200 | 14.7 | 102 | −166 | Machined region |
| 250 | 14.6 | 100 | 16 | Unmachined region (first region) |
| 300 | 14.5 | | 31 | |
| 350 | 14 | | 33 | |
| 400 | 14.3 | | 18 | |

In addition, a strain amount (machining amount) introduced into a metal structure inside the raceway surface by burnishing was measured. First, the inner ring of the 6206 deep groove ball bearing manufactured in the same manner as the 6206 deep groove ball bearing of Example 1 was subjected to burnishing, and thereafter subjected to mechanical polishing on the cross-section of the raceway surface thereof and subjected to chemical polishing using colloidal silica. An electron backscatter diffraction analysis was performed on a plurality of measurement points in the cross-section of the polished raceway surface by using an electron backscatter diffraction analyzer manufactured by TSL Solutions Inc., and a microstructure analysis was performed with respect to the analysis result by using orientation imaging microscopy (OIM) analysis software developed by TSL Solutions Inc.

That is, sharpness of the Kikuchi line for each measurement point which was obtained in the electron backscatter diffraction analysis was Hough transformed (Hough transform), and a Hough transform value (hereinafter also referred to as "IQ value") for each measurement point was obtained. With respect to each of pixels constituting an image obtained by photographing the cross-section of the raceway surface, an IQ value for a measurement point at a position corresponding to the pixel was applied, and a color corresponding to a magnitude of the IQ value was displayed on each pixel of the image, thereby creating map data of the cross-section of the raceway surface. Thereafter, the map data is subjected to image analysis, and a distribution curve indicating the distribution of the IQ values in the map data is created on the orthogonal coordinates having the IQ value as the X axis and a frequency of the IQ value as the Y axis. A machining amount of a non-overlapping region not overlapping a region surrounded by the distribution curve of a non-fatigued part which is not fatigued due to the burnishing and the X axis, among a region in the orthogonal coordinates surrounded by the distribution curve of a part which is fatigued due to burnishing and the X axis, is calculated. That is, by subtracting a strain amount of the non-fatigued part from a strain amount of the part fatigued due to burnishing, the strain amount (machining amount) introduced into the cross-section of the raceway surface by burnishing can be evaluated.

Table 4 shows the strain amount (machining amount) in the depth direction from the surface of the raceway surface of the inner ring of the 6206 deep groove ball bearing of Example 1. It can be seen that a strain amount (machining amount) from the surface of the raceway surface to a depth of 150 μm is 0.03 or more, and a strain amount (machining amount) in the second region is suitably 0.03 or more.

TABLE 4

| Depth from surface of raceway surface | Strain amount (machining amount) |
|---|---|
| 0 μm to 50 μm or less | 0.10 |
| Over 50 μm to 100 μm or less | 0.05 |
| Over 100 μm to 150 μm or less | 0.03 |
| Over 150 μm to 200 μm or less | 0.02 |

Although the embodiments are described above with reference to the drawings, it is needless to say that the present invention is not limited to such examples. It will be apparent to those skilled in the art which various changes and modifications may be conceived within the scope of the claims. It is also understood that the various changes and modifications belong to the technical scope of the present invention. Components in the embodiments described above may be combined freely within a range not departing from the spirit of the present invention.

The present application is based on Japanese Patent Application No. 2020-024705 filed on Feb. 17, 2020, the contents which are incorporated herein by reference.

REFERENCE SIGNS LIST

1 radial ball bearing
2 outer ring raceway surface
3 outer ring
4 inner ring raceway surface
5 inner ring
6 ball
7 cage

The invention claimed is:

1. A rolling bearing in which a plurality of rolling elements are rollably held between an inner ring and an outer ring,
   wherein in a raceway surface of at least one of the inner ring and the outer ring, a region not affected by machining is set as a first region, and a region, which has:
   (a) a machining amount of 0.03 or more;
   (b) an amount of retained austenite being 70% or more of an amount of retained austenite in the first region; and
   (c) a compressive residual stress being higher by 500 MPa or more than a compressive residual stress in the first region, is set as a second region.

2. A method for manufacturing the rolling bearing according to claim 1,
   wherein after subjecting the inner ring and the outer ring to a quenching and tempering treatment, machining is performed on the raceway surface of at least one of the inner ring and the outer ring under a condition that a maximum contact surface pressure with a machining jig is 7.2 GPa or less, which is calculated assuming that only elastic deformation occurs.

* * * * *